United States Patent [19]

Senatore et al.

[11] Patent Number: 5,155,207

[45] Date of Patent: Oct. 13, 1992

[54] ARYLENE SULFIDE POLYMERS AND ARTICLES OF MANUFACTURE

[75] Inventors: Guy Senatore, Borger, Tex.; Liang Yeon F., Taipei, Taiwan

[73] Assignee: Phillips Petroleum Company, Bartlesville, Okla.

[21] Appl. No.: 485,396

[22] Filed: Feb. 23, 1990

Related U.S. Application Data

[62] Division of Ser. No. 291,848, Dec. 29, 1988, abandoned.

[51] Int. Cl.$^5$ .......................... C08G 75/14; B28B 3/20
[52] U.S. Cl. ................... 528/388; 264/176.1; 264/177.1; 528/387; 428/419
[58] Field of Search .............................. 528/388, 387; 264/177.1, 176.1; 428/419

[56] References Cited

U.S. PATENT DOCUMENTS

| | | |
|---|---|---|
| 3,354,129 | 11/1967 | Edmonds, Jr. et al. . |
| 3,524,835 | 8/1970 | Edmonds Jr. et al. . |
| 3,869,434 | 3/1975 | Campbell et al. . |
| 3,919,177 | 11/1975 | Campbell ........................ 528/388 |
| 4,451,640 | 5/1984 | Shiski et al. ..................... 528/265 |
| 4,490,522 | 12/1984 | Kawahata et al. ............... 528/388 |
| 4,500,702 | 2/1985 | Qatlinning et al. .............. 528/388 |
| 4,537,953 | 8/1985 | Kawakami et al. ............. 528/388 |
| 4,613,654 | 9/1986 | Katto et al. ..................... 525/537 |
| 4,663,430 | 5/1987 | Qatlinning et al. .............. 528/388 |
| 4,711,796 | 12/1987 | Yu et al. .......................... 427/185 |
| 4,801,416 | 1/1989 | Kobayashi et al. ............. 264/177.1 |
| 4,820,800 | 4/1989 | Geibel et al. .................... 528/388 |

FOREIGN PATENT DOCUMENTS

| | | |
|---|---|---|
| 0166451 | 1/1986 | European Pat. Off. . |
| 0189895 | 8/1986 | European Pat. Off. . |
| 0189927 | 8/1986 | European Pat. Off. . |
| 0226909 | 7/1987 | European Pat. Off. . |
| 0257228 | 3/1988 | European Pat. Off. . |
| 0275687 | 7/1988 | European Pat. Off. . |
| 0280271 | 8/1988 | European Pat. Off. . |
| 0280274 | 8/1988 | European Pat. Off. . |
| 3644365 | 7/1987 | Fed. Rep. of Germany . |
| 3644366 | 7/1987 | Fed. Rep. of Germany . |
| 5949232 | 3/1984 | Japan . |
| 816134 | 7/1985 | U.S.S.R. . |
| 2184977 | 7/1987 | United Kingdom . |
| 2184978 | 7/1987 | United Kingdom . |
| 2189428 | 10/1987 | United Kingdom . |
| 2192831 | 1/1988 | United Kingdom . |

Primary Examiner—John Kight, III
Assistant Examiner—T. Mosley
Attorney, Agent, or Firm—Richmond, Phillips, Hitchcock & Carver

[57] ABSTRACT

Films and fibers are prepared from arylene sulfide resins comprising first recurring units consisting of aromatic structures having the form:

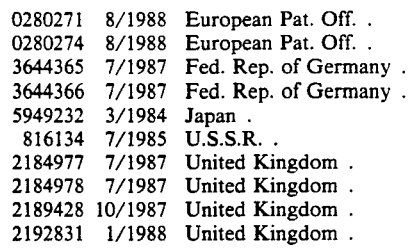

and second recurring units including units selected from aromatic structures having the form:

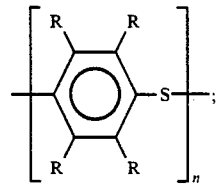

and

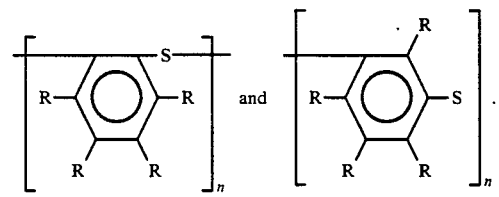

26 Claims, No Drawings

ARYLENE SULFIDE POLYMERS AND ARTICLES OF MANUFACTURE

This application is a division of application Ser. No. 291,848, filed Dec. 29, 1988, now abandoned.

FIELD OF THE INVENTION

This invention relates to arylene sulfide polymers. It further relates to articles of manufacture produced from arylene sulfide polymers. In a specific aspect, the invention relates to films and fibers produced from arylene sulfide polymers.

BACKGROUND OF THE INVENTION

The production of arylene sulfide polymers for a variety of industrial and commercial uses is known. A commercially-successful method for preparing arylene sulfide polymers in a reaction mixture, during a polymerization process, containing a p-dihaloaromatic compound (e.g., p-diohlorobenzene), an alkali metal sulfide (e.g., sodium sulfide), water, and an organic amide (e.g., N-methyl-2-pyrrolidone), is disclosed in U.S. Pat. No. 3,354,129.

Interest in the use of arylene sulfide polymers for the production of many different articles of manufacture such as films and fibers is continually growing. As for arylene sulfide films and/or fibers, their efficient production often requires, or is benefitted by, polymeric resins having lower temperatures of melt crystallization. This characteristic increases processability time which is desirable in the production of polymeric films and fibers.

SUMMARY OF THE INVENTION

It is, thus, one object of the invention to provide novel arylene sulfide resins having a low temperature of melt crystallization.

Another object of this invention is to provide novel articles of manufacture, especially polymeric fibers and/or polymeric films, prepared from above-identified novel arylene sulfide resins having lower temperatures of melt crystallization.

Still a further object of this invention is to provide processes for preparing the above-identified novel arylene sulfide resins having a low temperature of melt crystallization and the novel articles of manufacture product therefrom.

Other objects, embodiments, advantages, features and details of this invention will become apparent to those skilled in the art from the following summary, detailed description, examples, and appended claims.

In accordance with s first embodiment of this invention, novel arylene sulfide resins, having low temperatures of melt crystallization are prepared by contacting, in a reaction mixture, during a polymerization process, reactants comprising: (a) a first monomer source consisting of a p-dihaloaromatic compound, (b) a second monomer source comprising at least one o-dihaloaromatic compound, (c) an organic amide, and (d) an alkali metal sulfide. The first monomer source is present in the reaction mixture of this first embodiment, prior to the initiation of the polymerization process, in an amount ranging from about 90 to about 99.9 mole percent; and, the second monomer source is present in this reaction mixture, prior to the initiation of the polymerization process, in an amount ranging from about 0.1 to about 10 mole percent. These mole percentages are based on the molar sum of (1) the first monomer source and the second monomer source present in this reaction mixture prior to the initiation of the polymerization process and (2) any component of the second monomer source, introduced into the reaction mixture, after the initiation of the polymerization process.

Optionally, the second monomer source can further comprise at least one polyhaloaromatic compound having at least three halogen substituents per molecule and/or at least one m-dihaloaromatic compound. Furthermore, when practicing this first embodiment, the reaction mixture can also, optionally, comprise at least one of the following reactants (1) a caustic material and (2) an alkali metal carboxylate. The optional components of the second monomer source and/or the optional reactants can be introduced in the reaction mixture either prior to the initiation of or during the polymerization process.

In accordance with a second embodiment, novel articles of manufacture are formed from the novel arylene sulfide resins prepared in accordance with the first embodiment of this invention. Generally, these novel articles of manufacture include, but are not limited to, molded polymeric objects, polymeric films, and polymeric fibers.

In accordance with a third embodiment of this invention, a process is provided for forming novel articles of manufacture consisting the steps of: (a) preparing an arylene sulfide resin comprising a plurality of first recurring units consisting of an aromatic structure having the form:

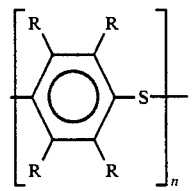

and a plurality of second recurring units comprising an aromatic structure having the form:

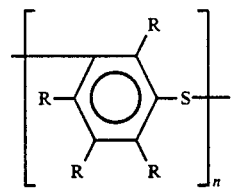

wherein, each R can be the same or different and is selected from the group consisting of hydrogen, alkyl groups having 1 to 20 carbon atoms, cycloalkyl groups having 5 to 20 carbon atoms, aryl groups having 6 to 24 carbon atoms, alkyl aryl groups having 7 to 24 carbon atoms, and aryl alkyl groups having from 7 to 24 carbon atoms; wherein n is the number of recurring units; and, wherein the plurality of first recurring units is present in an amount ranging from about 90 to about 99.9 mole percent; and, the plurality of second recurring units is present in an amount ranging from about 0.1 to about 10 mole percent, said mole percentages are based on the molar sum of the plurality of first recurring units and the plurality of second recurring units present in the arylene sulfide resin; and (b) forming an article of manufacture from the arylene sulfide resin prepared in step (a).

Optionally, the plurality of second recurring units can further comprise at least one aromatic unit having the form:

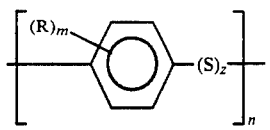

wherein, R and n are defined as above; m is ≦3; z is ≧2; and, m+z=5. Moreover, the plurality of second recurring units can even further comprise at least are aromatic unit having the form:

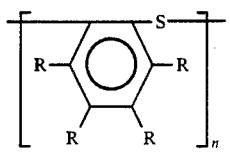

wherein, R and n are defined as above.

DETAILED DESCRIPTION OF THE INVENTION

As used herein, the term "arylene sulfide resin (polymer)" refers to a polymer, which is at least semi-crystalline, having the structure:

wherein, X and Y are selected from the groups —S—, —O—, —SO$_2$—, —CO—; X and Y may be the same or different; at least X or Y is —S—; Ar and Ar' are selected from the group:

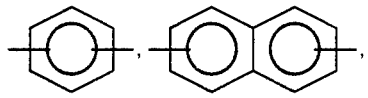

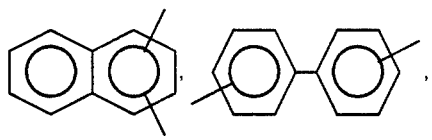

and alkyl and aryl derivatives thereof; Ar and Ar' may be the same or different; and, n is the number of recurring units and is sufficiently are that the polymer has useful film and/or fiber properties.

The term "melting temperature" (Tm) as used herein, refers to the endothermic peak of a Differential Scanning Calorimeter (DSC) obtained as the temperature is increased at a rate of approximately 20° C./min.

The term "melt crystallization temperature" (Tmc) as used herein, refers to the exothermic peak of the DSC obtained by cooling the polymeric sample, from a temperature approximately 40° C. above the melting point of the sample, at a rate of approximately 20° C./min.

In accordance with the first embodiment of this invention, novel arylene sulfide resins, having low temperatures of melt crystallization (Tmc), are prepared by contacting, in reaction mixture, during a polymerization process, reactants comprising: (a) a first monomer source consisting of a p-dihaloaromatic compound, (b) a second monomer source comprising at least one o-dihaloaromatic compound, (c) an organic amide, and (d) an alkali metal sulfide. The first monomer source is present in the reaction mixture of this first embodiment, prior to the initiation of the polymerization process, in an mount ranging from about 90 to about 99.9 mole percent, preferably, from about 90 to about 97 mole percent. The second monomer source on the other hand, is present in this reaction mixture, prior to the initiation of the polymerization process, in an amount ranging from about 0.1 to about 10 mole percent, preferably, from about 3 to about 10 mole percent. These aforementioned mole percentages are based on the molar sum of (I) the first monomer source and the second monomer source present in this reaction mixture prior to the initiation of the polymerization process and (2) any component of the second monomer source, introduced into the reaction mixture, after the initiation of the polymerization process.

The novel arylene sulfide resins, prepared in accordance with the first embodiment of this invention, generally comprise from about 90 to about 99.9 mole percent, preferably from about 90 to about 97 mole percent of recurring aromatic units having the form:

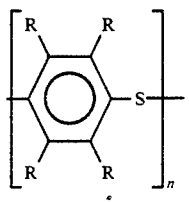

and from about 0.1 to about 10 mole percent, preferably from about 3 to about 10 mole percent of recurring aromatic units having the form:

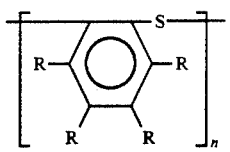

wherein, each R can be the same or different and is selected from the group consisting of hydrogen, alkyl groups having 1 to 20 carbon atoms, cycloalkyl groups having 5 to 20 carbon atoms, aryl groups having 6 to 24 carbon atoms, alkyl aryl groups having 7 to 24 carbon atoms, and aryl alkyl groups having from 7 to 24 carbon atoms; wherein n is the number of recurring units; and, wherein the mole percentages are based upon the molar sum of all recurring units present in the resulting arylene sulfide resin.

When practicing the first embodiment of this invention, the first monomer source, which consists of a p-dihaloaromatic compound, can be represented by the formula:

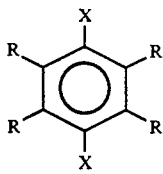

wherein, each X is any suitable halogen selected from group 7a of the Mendelevium Periodic Table of Elements; and, wherein each R is the same as earlier defined. Preferably, X is selected from the group consisting of chlorine, bromine, and iodine; and, R is hydrogen.

Any suitable p-dihaloaromatic compound can be employed as the first monomer source when practicing this first embodiment. Examples of such suitable p-dihaloaromatic compounds, include, but are not limited to, 1,4-dichlorobenzene, 1,4-dibromobenzene, 1,4-diiodobenzene, 1-chloro-4-bromobenzene, and the like and/or admixtures thereof. Preferably, the p-dihaloaromatic compound employed in this first embodiment as the first monomer source is 1,4-dichlorobenzene (p-DCB).

When practicing this first embodiment, the selected p-dihaloaromatic compound is generally present in the reaction mixture, prior to the initiation of the polymerization process, in an amount ranging from about 90 to about 99.9 mole percent, preferably, from about 90 to about 97 mole percent. These mole percentages are based on the molar sum of (I) the first monomer source and the second monomer source present in this reaction mixture prior to the initiation of the polymerization process and (2) any component of the second monomer source, introduced into the reaction mixture, after the initiation of the polymerization process.

The second monomers source employed, when practicing this first embodiment, comprises at least one o-dihaloaromatic compound represented by the formula:

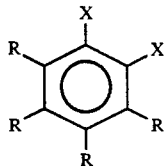

wherein, R and X are defined as above. In a presently preferred embodiment, the halogen (i e., the X group) of this second monomer source is selected from the group consisting of chlorine, bromine, and iodine; and, R is hydrogen.

Any suitable o-dihaloaromatic compound can be employed in this first embodiment as the second monomer source. Examples of such suitable o-dihaloaromatic compounds include, but are not limited to, 1,2-dichlorobenzene, 1,2-dibromobenzene, 1,2-diiodobenzene, 1-chloro-2-bromobenzene, 1-chloro-2-iodobenzene, 1-bromo-2-iodobenzene, and the like, and/or admixtures thereof. Preferably, the o-dihaloaromatic compound employed as the second monomer source is 1,2-dichlorobenzene (o-DCB).

When practicing this first embodiment, the selected o-dihaloaromatic compound, is generally present in the reaction mixture, prior to the initiation of the polymerization process in an amount ranging from about 0.1 to about 10 mole percent, preferably, from about 3 to about 10 mole percent. These mole percentages are based on the molar sum of (1) the first monomer source and the second monomer source present in this reaction mixture prior to the initiation of the polymerization process and (2) any component of the second monomer source, introduced into the reaction mixture, after the initiation of the polymerization process.

In addition to the first and second monomer sources, when practicing the first embodiment of this invention, the reaction mixture further comprises an organic amide. This organic amide must retain the characteristic of remaining in a liquid state under the particular reaction temperatures and pressures.

Any suitable organic amide having this characteristic can be employed. A suitable organic amide can be cyclic or acyclic and have from 1 to about 10 carbon atoms per molecule. Examples of such suitable organic amides include, but are not limited to, formamide, acetamide, N-methylformsmide, hexamethylphosphoramide, N,N-dimethylacetamide, 2-pyrrolidone, N-cyclohexyl-2-pyrrolidone, N-ethyl-2-pyrrolidone, N-methyl-2-pyrrolidone, E-caprolactam, 1,3-dimethyl-2-imidazolidinone, dimethylsulfoxide, and the like, and/or mixtures thereof. Preferably, the organic amide employed is N-methyl-2.pyrrolidone (NMP).

When practicing this first embodiment, the selected organic amide is generally present in the reaction mixture, during the polymerization process, in an amount ranging from about 100 to about 600 mole percent, preferably, from about 250 to about 400 mole percent. These mole percentages are based on the molar sum of (1) the first monomer source and the second monomer source present in this reaction mixture prior to the initiation of the polymerization process and (2) any component of the second monomer source, introduced into the reaction mixture, after the initiation of the polymerization process.

When practicing this first embodiment, the alkali metal sulfide present in the reaction mixture, during the polymerization process, can result from either (1) an alkali metal sulfide being introduced to the reaction mixture, prior to the initiation of the polymerization process, or (2) a reaction between s suitable sulfur source and a suitable base prior to and/or during the polymerization process.

The amount of alkali metal sulfide present in the reaction mixture, during the polymerization process, when practicing the first embodiment of this invention, generally ranges from about 90 to about 100 mole percent, preferably, from about 96 to about 99 mole percent. These mole percentages are based on the molar sum of (1) the first monomer source and the second monomer source present in this reaction mixture prior to the initiation of the polymerization process and (2) any component of the second monomer source, introduced into the reaction mixture, after the initiation of the polymerization process.

Examples of alkali metal sulfides, which can be charged to the polymerization mixture prior to the polymerization process include, but are not limited to, sodium sulfide, potassium sulfide, rubidium sulfide, cesium sulfide and mixtures thereof. The alkali metal sulfide can be used (1) in the anhydrous form, (2) as a hydrate, or (3) as an aqueous mixture or solution. The presently preferred alkali metal sulfide is sodium sulfide.

As stated above, the alkali metal sulfide present during the polymerization process can also result from a reaction between a suitable sulfur source and a suitable base prior to and/or during the polymerization process. Examples of such suitable sulfur sources include, but are not limited to, alkali metal hydrosulfides, thiosulfates (which include those of lithium, sodium, potassium, rubidium, cesium, magnesium, calcium, strontium, barium), hydrogen sulfide, carbon disulfide, N-methyl pyrrolidine-2-thione, thioacetic acid and mixtures thereof.

These aforementioned sulfur sources are able to react, prior to and/or during the polymerization process, with a suitable base, to result in the alkali metal sulfide present during the polymerization process. Examples of such suitable bases include, but are not limited to, sodium hydroxide, lithium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof. If desired, the suitable base can be produced in situ.

Although the quantity of the aforementioned base which reacts with the sulfur source to result in the alkali metal sulfide, differs with the specific base and/or sulfur source employed, the amount of base employed generally ranges from about the stoichiometric amount to about 0.75 mole in excess thereof. Preferably, the amount of base employed ranges from about the stoichiometric amount to about 0.5 mole in excess thereof; more preferably, from about the stoichiometric amount to about 0.25 mole in excess thereof.

The amount of alkali metal sulfide present in the reaction mixture, during the polymerization process, when practicing the first embodiment of this invention, generally ranges from about 90 to about 100 mole percent, preferably, from about 96 to about 99 mole percent. These mole percentages are based on the molar sum of (1) the first monomer source and the second monomer source present in this reaction mixture prior to the initiation of the polymerization process and (2) any component of the second monomer source, introduced into the reaction mixture, after the initiation of the polymerization process.

In addition to the o-dihaloaromatic compound present in the reaction mixture prior to the initiation of the polymerization process, the second monomer source of this first embodiment can, optionally, further comprise a polyhaloaromatic compound having at least three halogen substituents per molecule. The polyhaloaromatic compounds which can, optionally, be employed as a component of the second monomer source can be represented by the formula:

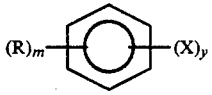

wherein, X and R are as defined above; y is $\geq 3$; m is $\leq 3$; and y+m=6. In a presently preferred embodiment, the halogen (i.e., the X group) of this polyhaloaromatic compound is selected from the group consisting of chlorine, bromine, and iodine; and, R is hydrogen.

Any suitable polyhaloaromatic compound can be, optionally, employed in this first embodiment as a component of the second monomer source. Examples of such suitable polyhaloaromatic compounds include, but are not limited to, 1,2,3-trichlorobenzene, 1,2,4-trichlorobenzene, 1,2,3,5-tetrabromobenzene, hexachlorobenzene, and the like, and/or admixtures thereof. When employed as an additional component of the second monomer source, the preferred polyhaloaromatic compound is 1,2,4-trichlorobenzene (TCB).

The implementation of a polyhaloaromatic compound as a component of the second monomer source results in the novel arylene sulfide resin comprising recurring aromatic units having the form:

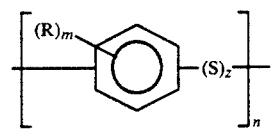

wherein, R and m are as defined above; z is $\geq 2$; and, m+z=5.

If used as an additional component of the second monomer source, when practicing this first embodiment the selected polyhaloaromatic compound is generally employed in an amount ranging from about 0.001 to about 1 mole percent, preferably, in the amount ranging from about 0.01 to about 1 mole percent. These mole percentages are based on the molar sum of (1) the first monomer source and the second monomer source present in this reaction mixture prior to the initiation of the polymerization process and (2) any component of the second monomer source, introduced into the reaction mixture, after the initiation of the Polymerization process. The selected polyhaloaromatic compound can be introduced into the reaction mixture at and time prior to and/or during the polymerization process.

In addition to the o-dihaloaromatic compound present in the reaction mixture prior to the initiation of the polymerization process, the second monomer source of this first embodiment can further, optionally, comprise a m-dihaloaromatic compound. The m-dihaloaromatic compound which can, optionally, be employed as a component of the second monomer source can be represented by the formula:

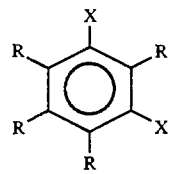

wherein, R and X are defined as above. In a presently preferred embodiment, the halogen (i.e., the X group) of this m-dihaloaromatic compound is selected from the group consisting of chlorine, bromine, and iodine; and, R is hydrogen.

Any suitable m-dihaloaromatic compound can be, optionally, employed in this first embodiment as a component of the second monomer source. Examples of such suitable m-dihaloaromatic compounds include, but are not limited to, 1,3-dichlorobenzene, 1,3-dibromobenzene, 1,3-diiodobenzene, 1-chloro-3-bromobenzene, 1-chloro-3-iodobenzene, 1-bromo-3-iodobenzene, and the like, and/or admixtures thereof. When employed as an additional component of the second monomer source, the preferred m-dihaloaromatic compound is 1,3-dichlorobenzene (m-DCB).

The implementation of an m-dihaloaromatic compound as a component of the second monomer source, results in the novel arylene sulfide resin comprising recurring aromatic units having the form:

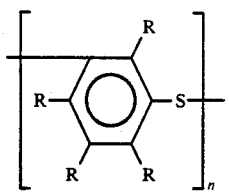

wherein, R and n are defined as above.

If used as an additional component of the second monomer source, when practicing this first embodiment, the selected m-dihaloaromatic compound is generally employed in an amount ranging from about 0.1 to about 8.9 mole percent, preferably, in an amount ranging from about 3 to about 8.9 mole percent. These mole percentages are based on the molar sum of (1) the first monomer source and the second monomer source present in this reaction mixture prior to the initiation of the polymerization process and (2) any component of the second monomer source, introduced into the reaction mixture, after the initiation of the polymerization process. The selected m-dihaloaromatic compound can be introduced into the reaction mixture any time prior to and/or during the polymerization process.

In addition to the first and second monomer sources, the organic amide, and the alkali metal sulfide, a caustic material can also, optionally, be present in the reaction mixture, during the polymerization process, when practicing the first embodiment of this invention. Any suitable caustic material can be employed. Examples of such suitable caustic materials include, but are not limited to, lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and the like, and/or admixtures thereof. If employed, the preferred caustic material is sodium hydroxide (NaOH).

The above-identified optional caustic materials can be used as such or produced by any suitable means. For example, if desired, the hydroxide or other caustic materials can be produced in situ (e.g. by the reaction of the corresponding oxide with water) prior to and/or during the polymerization process.

If used, the selected caustic material is generally employed in an amount ranging from about 0.001 to about 15 mole percent, preferably, in an amount ranging from about 0.01 to about 5 mole percent. These mole percentages are based on the molar sum of (1) the first monomer source and the second monomer source present in this reaction mixture prior to the initiation of the polymerization process and (2) component of the second monomer source, introduced into the reaction mixture, after the initiation of the polymerization process. The selected caustic material can be introduced into the reaction mixture any time prior to and/or during the polymerization process.

In addition to the first and second monomer sources, the organic amide, and the alkali metal sulfide, an alkali metal carboxylate can also, optionally, be present in the reaction mixture, during the polymerization process, when practicing the first embodiment of this invention. Suitable alkali metal carboxylates which can be, optionally, employed can be represented by the formula:

$$R'CO_2M$$

wherein H is an alkali metal selected from the group consisting of lithium, sodium, potassium, rubidium and cesium; and, R' is a hydrocarbyl radical selected from the group comprising alkyl, cycloalkyl, aryl groups and the like, and/or admixtures thereof. The selected hydrocarbyl radical generally has 1 to about 20 carbon atoms. In a preferred embodiment, R' is either an alkyl radical having 1 to about 6 carbon atoms or a phenyl radical; and, M is selected from the group consisting of lithium and sodium.

Any suitable alkali metal carboxylate can be, optionally, employed in this first embodiment. Examples of suitable alkali metal carboxylates include, but are not limited to, mono-, di- or polycarboxylates or any other suitable chemical agent. Preferably, the alkali metal carboxylates optionally employed are selected from the group consisting of lithium acetate, sodium acetate, sodium formate, potassium acetate, lithium propionate, sodium propionate, lithium 2-methyl propionate, rubidium butyrate, potassium benzoate, sodium benzoate, lithium phenyl acetate, and the like, and/or admixtures thereof. More preferably, the alkali metal carboxylate optionally employed is sodium acetate (NaOAc).

If used, the selected alkali metal carboxylate compound is generally employed in an amount ranging from about 0.002 to about 100 mole percent, preferably, in an amount ranging from about 0.01 to about 50 mole percent. These mole percentages are based on the molar sum of (1) the first monomer source and the second monomer source present in this reaction mixture prior to the initiation of the polymerization process and (2) any component of the second monomer source, introduced into the reaction mixture, after the initiation of the polymerization process. The selected alkali metal carboxylate can be introduced into the reaction mixture any time prior to and/or during the polymerization process.

The conditions of polymerization for the novel arylene sulfide resins prepared in accordance with the first embodiment of this invention, are generally known and can vary widely. Generally, the conditions can include a reaction temperature in the range of about 200° C. (392° F.) to about 343° C. (650° F.), preferably, in the range from about 215° C. (419° F.) to about 316° C. (600° F.). Although the reaction time of polymerization process, resulting in the novel arylene sulfide resin of the first embodiment, can vary widely, it will generally range from about 0.5 hour to about 72 hours, preferably, from about 1 hour to about 16 hours. Moreover, the pressure at which the reaction will be carried out is autogenous. Although autogenous, this pressure should be sufficient to maintain the organic amide in a liquid phase during the polymerization process.

The resulting novel arylene sulfide resin prepared in accordance with the first embodiment of this invention, can be recovered from the reaction mixture after the completion of the polymerization process by any suitable means. Examples of such suitable recovery means include, but are not limited to, liquid quench processes, steam quench processes, flash recovery processes, filtration processes, screening processes, and centrifuging processes.

In accordance with a second embodiment of this invention, articles of manufacture are formed from the novel arylene sulfide resin prepared in accordance with the aforementioned first embodiment. Examples of such articles of manufacture include, but are not limited to, molded polymeric objects, polymeric fibers and polymeric films. Such articles can be formed directly after formation and recovery of the resin as described hereinabove, or the polymer may be subjected to any desired past treatment after formation and before fabrication.

The novel arylene sulfide resin, prepared in accordance with the first embodiment of this invention, is characterized as having a markedly lower temperature of melt crystallization (Tmc) while retaining its original melting temperature (Tm). This characteristic increases the resin as processability time. This increased processability time is a desired characteristic especially when the article of manufacture being formed therefrom is polymeric fibers or polymeric films. Specifically, when forming polymeric fibers in accordance with the second embodiment of this invention, the polymeric fiber experiences an increased drawability time which enables the formation of thinner fibers. On the other hand, when forming polymeric films in accordance with the second embodiment of this invention, the increased processability time enables biaxial orientation of the film. The general and preferred characteristics of biaxially oriented films, and the process for making the same, are discussed latter in this specification.

In accordance with a third embodiment, this invention provides a novel process for preparing articles of manufacture consisting the steps of: (a) preparing an arylene sulfide resin comprising a plurality of first recurring units consisting of an aromatic structure having the form:

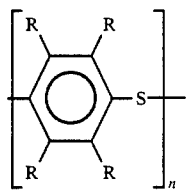

and a plurality of second recurring units comprising an aromatic structure having the form:

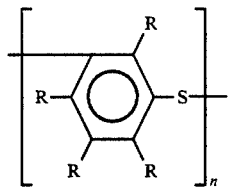

wherein, each R can be the same or different and is selected from the group consisting of hydrogen, alkyl groups having 1 to 20 carbon atoms, cycloalkyl groups having 5 to 20 carbon atoms, aryl groups having 6 to 24 carbon atoms, alkyl aryl groups having 7 to 24 carbon atoms, and aryl alkyl groups having from 7 to 24 carbon atoms; wherein n is the number of recurring units; and, wherein the plurality of first recurring units is present in an amount ranging from about 90 to about 99.9 mole percent; and, the plurality of second recurring units is present in an amount ranging from about 0.1 to about 10 mole percent, said mole percentages being based on the molar sum of the plurality of first recurring units and the plurality second recurring units present in the arylene sulfide resin; and (b) forming an article of manufacture from the arylene sulfide resin prepared in step (a).

When practicing this third embodiment, the arylene sulfide resin of step (a) can be prepared by any suitable process known to those skilled in the art. An example of one such suitable process comprises contacting, in a reaction mixture, during a polymerization process, reactants comprising: (a) a first monomer source consisting of at least one p-dihaloaromatic compound, (b) a second monomer source comprising at least one m-dihaloaromatic compound, (c) and organic amide, and (d) and alkali metal sulfide. In this example of preparing the arylene sulfide resin for step (a) of the third embodiment of this invention, the first monomer source is present in the reaction mixture, prior to the initiation of the polymerization process, in an amount ranging from about 90 to about 99.9 mole percent; and, the second monomer source is present in the reaction mixture, prior to the initiation of the polymerization process, in an amount ranging from about 0.1 to about 10 mole percent. These mole percentages are based on the molar sum of (1) the first monomer source and the second monomer source present in this reaction mixture prior to the initiation of the polymerization process and (2) and component of the second monomer source, introduced into the reaction mixture after the initiation of the polymerization process.

The first monomer source, consisting of at least one p-dihaloaromatic compound, can be represented by the same p-dihaloaromatic compound formula recited in the discussion of the first embodiment of this invention. The general and preferred examples of the p-dihaloaromatic compound and the general and preferred amounts in which it can be employed are also the same as disclosed in the discussion of the first embodiment of this invention.

The second monomer source, which can be employed in the above process for preparing the arylene sulfide resin used in step (a) of the third embodiment, comprises at least one m-dihaloaromatic compound represented by the formula:

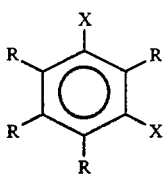

wherein, each X is any suitable halogen selected from Group 7a of the Medelevium Periodic Table of Elements; and, wherein each R is the same as disclosed in the discussion of the first embodiment of this invention.

The general and specific examples of the m-dihaloaromatic compound which can be employed in the preparation of the arylene sulfide resin used in step (a) of this third embodiment, are the same as those recited when disclosing the m-dihaloaromatic compound which can, optionally, be employed, as a component of the second monomer source when preparing the novel arylene sulfide resin of the first embodiment.

The selected m-dihaloaromatic compound is generally employed in an amount ranging from about 0.1 to about 10 mole percent, preferably, from about 3 to about 10 mole percent. These mole percentages are based on the molar sum of (1) the first monomer source and the second monomer source present in this reaction mixture prior to the initiation of the polymerization process and (2) any component of the second monomer source, introduced into the reaction mixture, after the initiation of the polymerization process.

The general and preferred examples of the organic amide present in the reaction mixture, and the general and preferred amounts in which it can be employed, when implementing the above process to prepare the arylene sulfide resin used in step (a) of this third embodiment, are the same as those recited when discussing the first embodiment of this invention.

The general and preferred examples of the alkali metal sulfide present in the reacting mixture, and the general and preferred amounts in which it can be employed, when implementing the above process to prepare the arylene sulfide resin used in step (a) of this third embodiment, are the same as these recited when discussing the first embodiment of this invention.

Optionally, when preparing the arylene sulfide resin for use in step (a) of the third embodiment in accordance with the above procedure, the second monomer source can further comprise at least one polyhaloaromatic compound and/or at least one o-dihaloaromatic compound.

The general and preferred polyhaloaromatic compound which can, optionally, comprise a component of the second monomer source, when preparing the arylene sulfide resin for use in step (a) of this third embodiment, and the general and preferred amounts in which it can be employed, are the same as those recited when discussing the first embodiment of this invention.

The general and preferred o-dihaloaromatic compound which can, also, optionally, comprise a component of the second monomer source, when preparing the arylene sulfide resin for use in step (a) of this third embodiment, are the same as those recited when discussing the first embodiment of this invention. If used, the selected o-dihaloaromatic compound is generally employed in an amount ranging from about 0.1 to about 8.9 mole percent, preferably, in an amount ranging from about 3 to about 8.9 mole percent.

A caustic material can also, optionally, be present in the reaction mixture, when employing the above process to prepare the arylene sulfide resin for step (a) of this third embodiment. The general and preferred caustic materials, and the general and preferred amounts in which they can, optionally, be employed, are the same as those recited when discussing the first embodiment of this invention.

An alkali metal carboxylate can also, optionally, be present in the reaction mixture, when employing the above process to prepare the arylene sulfide resin for step (a) of this third embodiment. The general and preferred alkali metal carboxylates, and the general and preferred amounts in which they can be employed are the same as those recited when discussing the first embodiment of this invention.

If the above process is employed to prepare the arylene sulfide resin, for use in step (s) of this third embodiment, the general and preferred polymerization conditions are the same as those recited when discussing the first embodiment of this invention.

When preparing the arylene sulfide resin for use in step (a) of this third embodiment in accordance with the above process, this resin is recovered from the reaction mixture after the completion of the polymerization process, washed and dried. No subsequent reaction between the recovered arylene sulfide resin and at least one strongly basic metal compounds is performed prior to forming the novel article of manufacture therefrom. While subsequent treatments of the arylene sulfide resin, of step (a) of this third embodiment, with reactants other than strongly basic metal compounds are within the scope of this invention, it is also within the scope of this invention to form the article of manufacture directly after the formation and recovery of the arylene sulfide resin, without the implementation of any intermediate treating processes.

Although the articles of manufacture prepared in accordance with the second and/or third embodiment of this invention can take any form, due to the increased processability time of the resins used in their formation, the articles of manufacture most apt to be formed therefrom are polymeric films and/or polymeric fibers.

If, when practicing these latter two embodiments, the article of manufacture produced is a polymeric film, the film-making process generally includes melt-extrusion or melt-pressing at a temperature in the range between the melting point of the arylene sulfide resin and about 333° C. 163° F.). This melt-extrusion or melt-pressing step is generally followed by a rapid quenching process to form a substantially amorphous film. For subsequent annealing or biaxial orientation, a substantially amorphous film is generally desired. Generally, a quench rate of greater than about 20° C. (36° F.)/sec. is necessary to produce a substantially amorphous, transparent, film having a degree of crystallinity of less than about 15 percent.

As used herein, the term "film" includes the term "sheet" although a distinction is sometimes made between these terms on the basis of the thickness of the object. Generally, the thickness of a film, as used herein, ranges from about 1 to about 15 mils.

As stated above, the arylene sulfide resins, formed into a film or sheet in accordance with the latter two embodiments of this invention, can further be annealed and/or biaxially oriented if additional high temperature stability, tensile strength and reduced thermal linear expansion are desired. The polymeric film can be biaxially oriented by any suitable process. Generally, an example of such a suitable process is disclosed in U.S. Pat. 4,286,018.

The arylene sulfide resins, formed into a film or sheet in accordance with the latter two embodiments of this invention, can also be biaxially oriented by 2-dimensional stretching in an area ratio ranging from about 4:1 to about 36:1 times, preferably, in the range from about 6:1 to about 25:1 times the film's original size. This method of biaxial orientation can be accomplished by any suitable simultaneous stretching, blowing or rolling process. Such a suitable stretching process for forming a biaxially oriented film is that in which an amorphous film is first stretched in one direction, usually longitudinally (i.e. in the machine direction), at a ratio range from about 2:1 to about 6:1 times its original size, at a temperature ranging from about 80° C. to about 140° C. or, more preferably, from about 100°–110° C. After longitudinal stretching, the film is stretched in the transverse direction at a ratio range from about 2:1 to about 6:1 times its original size, at a temperature ranging from about 80° C. to about 140° C., or, more preferably, from about 100°–110° C.

While the biaxially oriented film is maintained under tension, it is subjected to an elevated temperature within the range from about 326° F. to approximately 25° F. below the melting point of the particular polymeric resin. This heat treatment may be carried out by any suitable means. Generally, the heat treatment is carried out by use of a conventional film tenter.

The density of the film can be expected to increase as the result of such annealing. Furthermore, the tensile strength of the novel biaxially-oriented film will generally exceed 60 MPa at yield.

The invention will still more fully be understood from the following examples. These examples are intended to illustrate embodiments of the invention and are, in no way, intended to limit the scope thereof.

EXAMPLE I

In this example, the preparation an arylene sulfide terpolymers, comprising the contacting of 1,4-dichlorobenzene (p-DCB), 1,2-dichlorobenzene (o-DCB) and 1,2,4-trichlorobenzene (TCB), is demonstrated.

To a stirred 2-gallon autoclave reactor were charged: 570.0 grams (6.00 moles) of aqueous sodium hydrosulfide (NaSH), 250.0 grams (6.25 moles) of sodium hydroxide (NaOH), 147.6 grams (1.80 moles) of sodium acetate (NaOAc), and 1600 milliliters (mL) of N-methyl-2-pyrrolidone (NMP). The reaction was purged, and its contents heated to 335° F. while stirring at about 250 r.p.m. About 350–400 mL of distillate (water and NMP) were collected.

Approximately 871.0 grams (5.92 moles) of p-dichlorobenzene (p-DCB), 33.1 grams (0.23 moles) of o-dichlorobenzene (o-DCB), 2.71 grams (0.015 moles) of 1,2,4-trichlorobenzene (TCB), and about 325 mL of NMP were then charged into the autoclave reactor. The amounts of p-DCB and o-DCB were chosen so as to provide a total of 6.15 mole concentration of p-DCB plus o-DCB. The reaction mixture was heated to about 455° F. for about 2 hours and then at about 509° F. for about 3 hours. During the first heating period, the internal reactor pressure ranged from about 40 to about 50 psig. During the second heating period, the internal reactor pressure ranged from about 160 psig to about 180 Psig.

After the polymerization reaction was essentially completed, the reactor contents were allowed to cool to room temperature. The phenylene sulfide terpolymeric resin was recovered, ground, washed and dried in a forced air oven at about 248° F. Hereinafter, this resin will be known as Resin 1.

Resin I was then dried at about 350° F. for about 16 hours. The dried terpolymeric resin was then pelletized on a ¼" Davis Standard extruder at about 600° F. The pellets were then vacuum dried at about 320° F. for about 16 hours. A 9-gram sample of the dried pellets was compression molded into a film at about 569° F./20 tons/1 minute. The film was quenched with ice water and submitted for thermal analysis. The pertinent physical properties of Resin 1 are listed in Table I.

Thirteen additional resin samples, Resins 2-14 inclusive, were prepared, dried and compression-molded using, essentially, the same procedure as set out when preparing Resin 1. The only major differences between the preparation of Resin 1 and the remaining resin samples of this example were amounts of NaOH p-DCB, o-DCB and TCB charged to the reactor. Specifically, in the preparation of Resins numbered 1, 2, 4, 13 and 14, 6.35 moles NaOH were charged to the reactor. On the other hand in the preparation of Resins numbered 3 and 9-12, 6.25 moles NaOH were charged to the reactor. For the remaining runs, the moles of NaOH charged were as follows: 5, 6.49; 6, 6.23; 7, 6.22; 8, 6.29; 15, 6.17. The varying amounts of the p-DCB o-DCB and TCB components, and the pertinent physical properties of the resulting polymeric resins are listed in Table I.

For Purposes of illustrating the utility of this invention, the pertinent physical properties of a control resin (hereinafter referred to as Resin 15), containing no moles of o-DCB, are also listed in Table I.

TABLE I

Effect of o-DCB Addition to p-DCB

| Resin | Mole used in Preparation of Polymer[d] | | | Flow Rate of Resin[a] | $Tmc^b$ (°C.) | $Tm^c$ (°C.) |
|---|---|---|---|---|---|---|
| | p-DCB | o-DCB | TCB | | | |
| 1 | 5.82 | 0.22 | 0.015 | 98 | 167 | 257 |
| 2 | 5.85 | 0.30 | 0.015 | 19 | 155 | 251 |
| 3 | 5.85 | 0.30 | 0.015 | 134 | None | 254 |
| 4 | 5.85 | 0.30 | 0.025 | 78 | None | 251 |
| 5 | 5.84 | 0.31 | 0.012 | 72 | 189 | 250 |
| 6 | 5.66 | 0.49 | 0.012 | 213 | None | 241 |
| 7 | 5.84 | 0.31 | 0.012 | 156 | 177 | 254 |
| 8 | 5.84 | 0.31 | 0.012 | 46 | 182 | 250 |
| 9 | 5.84 | 0.31 | 0.012 | 112 | 171 | 252 |
| 10 | 5.85 | 0.30 | 0.008 | 1351 | 196 | 253 |
| 11 | 6.00 | 0.15 | 0.008 | 276 | 170 | 264 |
| 12 | 5.85 | 0.30 | 0.008 | 240 | None | $ND^e$ |
| 13 | 5.70 | 0.45 | 0.015 | 1864 | None | 239 |
| 14 | 5.92 | 0.22 | 0.015 | 976 | 168 | 260 |
| 15 | 6.15 | 0 | 0.015 | 66 | 207 | 275 |

[a]Given in terms of number of grams/10 minutes: determined by 316° C. in accordance with a modified ASTM D1238 procedure, employing an orifice of 0.0825" diameter and 0.315" length, and an effective weight of 5.0 Kg (including the weight of the piston).
[b]Melt Crystallization Temperature: determined with a Perkins-Elmer DSC-26 scanning calorimeter by cooling the polymer melt from an initial temperature of 360° C. at a rate of 20° C./min.
[c]The melting temperature (Tm) is that as quenched as opposed to as received. The method of quenching was to heat in DSC apparatus to 320° C., hold at 320° C. five minutes and plunge into liquid nitrogen.
[d]Resins 5-9 were prepared on a larger scale than indicated but the moles used listed were proportionately reduced from listing in this table for ease in comparison with the other resins listed.
[e]"ND" means indicated value was not determined.

The data of Table I clearly demonstrates that the melt crystallization temperature (Tmc) of inventive Resins 1–4 are all lower than that of control Resin 15. As stated earlier, this lower melt crystallization temperature (Tmc) is advantageous in many areas, such as film and fiber production, due to its providing a greater processing time for increasing stretch orientation and drawing time, respectively.

The glass transition temperature (Tg) and crystallization temperature (Tc) were about the same for all the resins and Table I (i.e., Tg: 90°-93° C. and Tc: 150°-160° C.).

EXAMPLE II

This example demonstrates the utility of some of the inventive resins of Example I. Specifically, the compression molded films of inventive Resins 1-9 and control Resin 15 were stretched from 3.0 to about 3.5 times their original size in a biaxial manner under the following conditions:

The samples were heated for 150 seconds before drawing and then drawn on a T. M. Long film stretcher with air heaters at 210° F. and plate heaters at 215° F.

The pertinent physical properties of the biaxially-oriented films, as prepared in accordance with the above identified procedure and under the above-identified conditions, are listed in Table II.

For purposes of illustrating the utility of this invention, the pertinent physical properties of control Resin 15 are also listed in Table II.

submitted for thermal analysis. The pertinent physical properties of Resin 19 are listed in Table III.

Four additional resin samples, Resins 17-20 inclusive,

TABLE II

Physical Properties of Biaxially Orientant Films Prepared from Inventive Resins

| Resin | Biaxial Draw Ratio | Film Thickness (mil) | Tensile Strength[c] | | | Elmendorf Tear Resist[a] (grams) |
|---|---|---|---|---|---|---|
| | | | At Break (MPa)[b] | At Yield (MPa) | Percent of Elongation | |
| 1 | 3.5:1 | 1.3 | 69 | 71 | 38 | 2.4 |
| 2 | 3.5:1 | 1.7 | 75 | 78 | 12 | 2.0 |
| 3 | 3.0:1 | 1.7 | 76 | 64 | 63 | 12.0 |
| 4 | 3.5:1 | 1.5 | 72 | 70 | 38 | 3.0 |
| 5 | 3.5:1 | 1.1/1.2 | 91/86 | 80/65 | 52/89 | 4.9/8.6 |
| 6 | 3.5:1 | 0.9/1.1 | 81/85 | 75/76 | 56/40 | 3.8/4.8 |
| 7 | 3.5:1 | 1.1/0.8 | 83/83 | 71/72 | 60/62 | 10.0/3.8 |
| 8 | 3.0:1 | 1.7/1.6 | 79/84 | 75/64 | 54/108 | 21.0/15.6 |
| 9 | 3.25:1 | 1.5/1.1 | 88/88 | 79/68 | 57/83 | 6.3/6.0 |
| 15 | 3.0:1 | 1.2 | 84 | 69 | 61 | 6.2 |

[a]Elmendorf Tear Resistance as determined in accordance with ASTM D1922-67 and as measured by an Elmendorf Model 60-2 Tear Tester.
[b]MPa is the standard pressure unit abbreviation for Mega Pascals which equals 145 p.s.i.
[c]Tensile Strength as determined in accordance with ASTM D882-79.

The data in Table II demonstrates that biaxially oriented films of inventive Resins 1-9 prepared from p-DCB and o-DCB exhibit improved tear properties when compared to the tear properties of control Resin 15. It is believed that the low Tmc of terpolymers of this invention is a beneficial factor in the preparation of biaxially oriented films since this slows crystallization of the extruded sheet and allows the sheet to cool to the substantially amorphous form.

EXAMPLE III

In this example, the preparation of arylene sulfide terpolymers, comprising the contacting of 1,4-dichlorobenzene (p-DCB), 1,3-dichlorobenzene (m-DCB), and 1,2,4-trichlorobenzene (TCB), is described.

To a stirred 2-gallon autoclave reactor were charged: 575.4 grams (6.06 moles) of aqueous NASH, 254.0 grams (6.35 moles) of NAOH, 147.6 grams (1.80 moles) of NaOAc, and 1600 mL of NMP. The reactor was purged, and its contents heated to 335° F. while stirring at about 250 r.p.m. About 350-400 mL of distillate (water and NMP) were collected.

Approximately 815.9 grams (5.55 moles) of p-DCB, 88.2 grams (0.60 moles) of m-DCB, 2.71 grams (0.015 moles) of TCB, and about 325 mL of NMP were then charged into the autoclave reactor. The amounts of p-DCB and m-DCB were chosen so as to provide a total of 6.15 mole concentration of p-DCB plus m-DC. The reaction mixture was heated at about 455° F. for about 2 hours and then at 509° F. for about 3 hours. During the first heating period, the internal reactor pressure ranged from about 40 to about 50 psig. During the second heating period, the internal reactor pressure ranged from about 160 to about 180 psig.

After the polymerization was essentially completed, the reactor contents were allowed to cool to room temperature, the phenylene sulfide terpolymeric resin was recovered, ground, washed and dried in a forced air oven at about 248° F. Hereinafter, this resin will be referred to as Resin 16.

Resin 16 was then dried at about 350° F. for about 16 hours. The dried terpolymeric resin was then pelletized on a ½" Davis Standard extruder at about 600° F. The pellets were then vacuum dried at 320° F. for about 16 hours. A 9 gram sample of the dried pellets were compression-molded into a film at about 569° F./20 tons/1 minute. The film was quenched with ice water and were prepared, dried and compression-molded using, essentially, the same procedure as set out for the preparation of Resin 16. The only difference between the preparation of Resin 16 and that of the remaining four resin samples was the amount of p-DCB, m-DCB and TCB added to the reactor. The specific amounts of the p-DCB, m-DCB and TCB components used for the preparation of Resins 16-20 are listed in the following table.

In order to demonstrate a utility of the polymers prepared in this example, the pertinent physical properties of inventive Resins 16-20 are compared to those of control Resin 15 in Table III.

TABLE III

Effect of m-DCB Addition to p-DCB

| Resin | Mole used in Preparation of Polymer | | | Flow Rate of Resin[a] | Tmc[b] (°C.) | Tm[c] (°C.) |
|---|---|---|---|---|---|---|
| | p-DCB | m-DCB | TCB | | | |
| 15 | 6.15 | 0 | 0.019 | 66 | 207 | 275 |
| 16 | 5.55 | 0.60 | 0.015 | 93 | None | 240 |
| 17 | 5.85 | 0.30 | 0.012 | 72 | 160 | 258 |
| 18 | 5.70 | 0.45 | 0.012 | 47 | 163 | 249 |
| 19 | 5.97 | 0.18 | 0.008 | 85 | 177 | 265 |
| 20 | 5.25 | 0.90 | 0.018 | 254 | None | ND[d] |

[a]See footnote a of Table I.
[b]See footnote b of Table 1.
[c]See footnote c of Table I.
[d]See footnote e of Table I.

The data of Table III demonstrates that the melt crystallization temperature (Tmc) of inventive Resins 16-20 are, in all instances, lower than that of control Resin 15. As stated earlier, the lower melt crystallization temperature (Tmc) is advantageous for many purposes, such as the slowing of the crystallization of the extruded sheet, allowing the sheet to cool to the substantially amorphous form.

The glass transition temperature (Tg) and crystallization temperature (Tc) were about the same for all the resins in Table III (i.e., Tg: 78°-88° C. and Tc: 157°-172° C.).

EXAMPLE IV

This example demonstrates a utility of inventive Resins 16-20 of Example III in biaxial oriented film applications. The compression molded films of control Resin 15 and inventive Resins 16-20 each were stretched from 3.0 to about 3.5 times their original size in biaxial directions under the following conditions: A T. M. Long film stretcher was used with the air heaters at 210° F. and the plate heaters at 215° F.

The pertinent physical properties of the biaxially oriented films, as prepared in accordance with the above-identified procedure and under the above-identified conditions listed in Table IV.

For purposes of demonstrating the utility of this invention, the pertinent physical properties of Control Resin 15 are also listed in Table IV.

TABLE IV

Physical Properties of Biaxially Orientant Films Prepared from Inventive Resins

| Resin | Biaxial Draw Ratio | Film Thickness (mil) | Tensile Strength[c] | | | Elmendorf Tear Resist[a] (grams) |
|---|---|---|---|---|---|---|
| | | | At Break (MPa)[b] | At Yield (MPa) | Percent of Elongation | |
| 15 | 3.0:1 | 1.2 | 84 | 69 | 61 | 6.2 |
| 16 | 3.0:1 | 1.2 | 59 | 64 | 37 | 11.0 |
| 17 | 3.75:1 | 1.0 | 80 | 71 | 44 | 3.0 |
| 18 | 4.0:1 | 0.7 | 111 | 85 | 43 | 2.3 |
| 19 | 3.75:1 | 0.9 | 83 | 68 | 57 | 3.3 |
| 20 | 2.5:1 | 2.6 | 57 | 61 | 41 | 35.6 |

[a]See footnote a of Table II.
[b]See footnote b of Table II.
[c]See footnote c of Table II.

The data of Table IV demonstrates that biaxially oriented films of the inventive Resins 16-20 prepared from p-DCB and m-DCB exhibit improved tear properties when compared to control Resin 15. It is believed that the low Tmc of terpolymers of this invention is a beneficial factor in the preparation of biaxially oriented films since this slows crystallization of the extruded sheet and allows the sheet to cool to the substantially amorphous form.

It is evident from the foregoing that various modifications can be made to the embodiments of this invention without departing from the spirit and scope thereof which will be apparent to those skilled in the art. Having thus described the invention, it is claimed as follows.

That which is claimed is:

1. A process for preparing a film from an arylene sulfide resin comprising the steps of:
   (a) melt extruding or melt pressing said arylene sulfide resin to form said film then b) rapidly quenching said film, wherein said arylene sulfide resin comprises:
   a plurality of first recurring units consisting of an aromatic structure having the formula

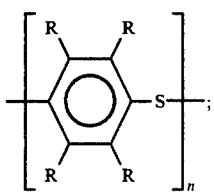

and a plurality of second recurring units including units selected from the group consisting of aromatic structures having the formulas

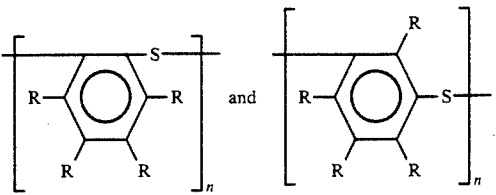

wherein, each R is the same or different and is selected from the group consisting of hydrogen, alkyl groups having 1 to 20 carbon atoms, cycloalkyl groups having 5 to 20 carbon atoms, aryl groups having 6 to 24 carbon atoms, alkyl aryl groups having 7 to 24 carbon atoms, and aryl alkyl groups having from 7 to 24 carbon atoms; wherein n is the number of recurring units; and, wherein said plurality of first recurring units is present in an amount ranging from about 90 to about 99.9 mole percent; and, said plurality of second recurring units is present in an amount ranging from about 0.1 to about 10 mole percent, said mole percentages are based on the molar sum of said plurality of first recurring units and said plurality of second recurring units present in said arylene sulfide resin.

2. A process in accordance with claim 1 wherein said arylene sulfide resin is poly(phenylene sulfide).

3. A process in accordance with claim 1 wherein said arylene sulfide resin is prepared in the presence of 0.001 to 1 mole percent based on the total moles of monomer present during said preparing of a polyhaloaromatic compound represented by the formula:

wherein each R is the same or different and is defined hereinbefore, X is a halogen, m≦3, and y≧3.

4. A process according to claim 1 wherein said second recurring units are said

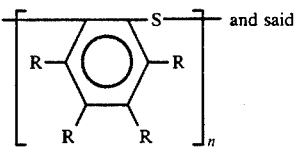 and said

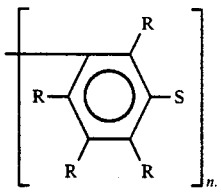

5. A process in accordance with claim 4 wherein said arylene sulfide resin is poly(phenylene sulfide) and wherein said

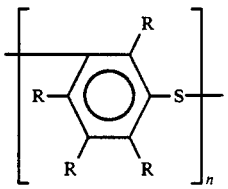

units are present in an amount ranging from 0.1 to 8.9 mole percent based on the molar sum of said plurality of first recurring units and said plurality of second units present in said arylene sulfide resin.

6. A process according to claim 1 wherein said arylene sulfide resin is poly(phenylene sulfide) and wherein said second recurring units are said

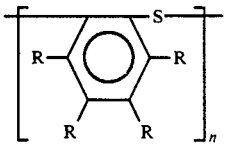

7. A process in accordance with claim 6 wherein said poly(phenylene sulfide) is prepared in the presence of 0.001 to 1 mole percent based on the total moles of monomer present during said preparing of a polyhaloaromatic compound represented by the formula:

wherein each R can be the same or different and is selected from the group consisting of hydrogen, alkyl groups having 1 to 20 carbon atoms, cycloalkyl groups having 5 to 20 carbon atoms, aryl groups having 6 to 24 carbon atoms, alkylaryl groups having 7 to 24 carbon atoms and aryl alkyl groups having 7 to 24 carbon atoms, X is a halogen, $m \leq 3$ and $y \geq 3$.

8. A process according to claim 7 wherein said polyhaloaromatic compound is 1,2,4-trichlorobenzene.

9. A process in accordance with claim 5 wherein said poly(phenylene sulfide) resin is prepared in the presence of 0.001 to 1 mole percent based on the total moles of monomer present during said preparing of a polyhaloaromatic compound represented by the formula:

wherein each R can be the same or different and is selected from the group consisting of hydrogen, alkyl groups having 1 to 20 carbon atoms, cycloalkyl groups having 5 to 20 carbon atoms, aryl groups having 6 to 24 carbon atoms, alkylaryl groups having 7 to 24 carbon atoms and aryl alkyl groups having 7 to 24 carbon atoms, X is a halogen, $m \leq 3$ and $y \geq 3$.

10. A process according to claim 9 wherein said polyhaloaromatic compound is 1,2,4-trichlorobenzene.

11. A film produced by the method of claim 1.

12. A film produced by the method of claim 4.

13. A film product produced by the method of claim 8.

14. A film produced by the method of claim 10.

15. A process according to claim 7 wherein said arylene sulfide resin is prepared by:

charging aqueous NaSH, NaOH, sodium acetate and N-methyl-2-pyrrolidone to a reaction zone to form a mixture;

heating said mixture to distill off water and N-methyl-2-pyrrolidone;

thereafter charging to said reaction zone 90 to 97 mole percent p-dichlorobenzene and 3 to 10 mole percent o-dichlorobenzene and 0.01 to 1 mole percent 1,2,4-trichlorobenzene, based on the total moles of said dichlorobenzenes and said trichlorobenzene;

thereafter heating to induce polymerization to form said poly(phenylene sulfide) resin; and recovering poly(phenylene sulfide) resin.

16. A process according to claim 10 wherein said arylene sulfide resin is prepared by:

charging aqueous NaSH, NaOH, sodium acetate and N-methyl-2-pyrrolidone to a reaction zone to form a mixture;

heating said mixture to distill off water and N-methyl-2-pyrrolidone;

thereafter charging to said reaction zone 90 to 97 mole percent p-dichlorobenzene and 3 to 10 mole percent m-dichlorobenzene and 0.01 to 1 mole percent 1,2,4-trichlorobenzene, based on the total moles of said dichlorobenzenes and said trichlorobenzene;

thereafter heating to induce polymerization to form said poly(phenylene sulfide) resin;

and recovering poly(phenylene sulfide) resin.

17. A process comprising drawing a fiber prepared from an arylene sulfide resin, wherein said arylene sulfide resin comprises a plurality of first recurring units consisting of an aromatic structure having the formula

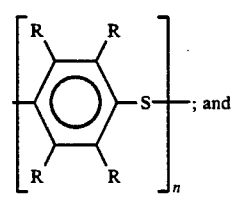

and a plurality of second recurring units including units selected from the group consisting of aromatic structures having the formulas

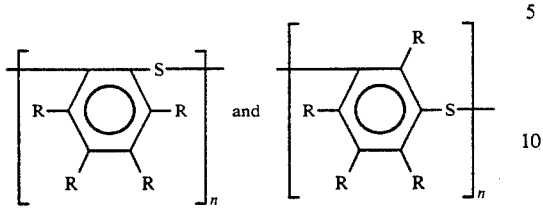

wherein, each R is the same or different and is selected from the group consisting of hydrogen, alkyl groups having 1 to 20 carbon atoms, cycloalkyl groups having 5 to 20 carbon atoms, aryl groups having 6 to 24 carbon atoms, alkyl aryl groups having 7 to 24 carbon atoms, and aryl alkyl groups having from 7 to 24 carbon atoms; wherein n is the number of recurring units; and, wherein said plurality of first recurring units is present in an amount ranging from about 90 to about 99.9 mole percent; and, said plurality of second recurring units is present in an amount ranging from about 0.1 to about 10 mole percent, said mole percentages are based on the molar sum of said plurality of first recurring units and said plurality of second recurring units present in said arylene sulfide resin.

18. A process in accordance with claim 17 wherein said arylene sulfide resin is poly(phenylene sulfide).

19. A process in accordance with claim 17 wherein said arylene sulfide resin is prepared in the presence of 0.001 to 1 mole percent based on the total moles of monomer present during said preparing of a polyhaloaromatic compound represented by the formula:

wherein each R is the same or different and is defined hereinbefore, X is a halogen, $m \leq 3$, and $y \geq 3$.

20. A process in accordance with claim 17 wherein said arylene sulfide resin is poly(phenylene sulfide) and wherein said

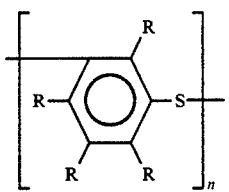

units are present in an amount ranging from 0.1 to 8.9 mole percent based on the molar sum of said plurality of first recurring units and said plurality of second units present in said arylene sulfide resins.

21. A process in accordance with claim 17 wherein said arylene sulfide resin is poly(phenylene sulfide) and wherein said second recurring units are said

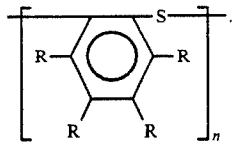

22. A process in accordance with claim 21 wherein said poly(phenylene sulfide) resin is prepared in the presence of 0.001 to 1 mole percent based on the total moles of monomer present during said preparing of a polyhaloaromatic compound represented by the formula:

wherein each R can be the same or different and is selected from the group consisting of hydrogen, alkyl groups having 1 to 20 carbon atoms, cycloalkyl groups having 5 to 20 carbon atoms, aryl groups having 6 to 24 carbon atoms, alkylaryl groups having 7 to 24 carbon atoms and aryl alkyl groups having 7 to 24 carbon atoms, X is a halogen, $m \leq 3$ and $y \geq 3$.

23. A process according to claim 22 wherein said polyhaloaromatic compound is 1,2,4-trichlorobenzene.

24. A process in accordance with claim 20 wherein said poly(phenylene sulfide) resin is prepared in the presence of 0.001 to 1 mole percent based on the total moles of monomer present during said preparing of a polyhaloaromatic compound represented by the formula:

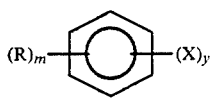

wherein each R can be the same or different and is selected from the group consisting of hydrogen, alkyl groups having 1 to 20 carbon atoms, cycloalkyl groups having 5 to 20 carbon atoms, aryl groups having 6 to 24 carbon atoms, alkylaryl groups having 7 to 24 carbon atoms and aryl alkyl groups having 7 to 24 carbon atoms, X is a halogen, $m \leq 3$ and $y \geq 3$.

25. A process according to claim 24 wherein said polyhaloaromatic compound is 1,2,4-trichlorobenzene.

26. A fiber produced by the process of claim 17.

* * * * *